Dec. 24, 1957 F. B. ZACKS 2,817,391
SEAT THROW
Filed Aug. 21, 1956
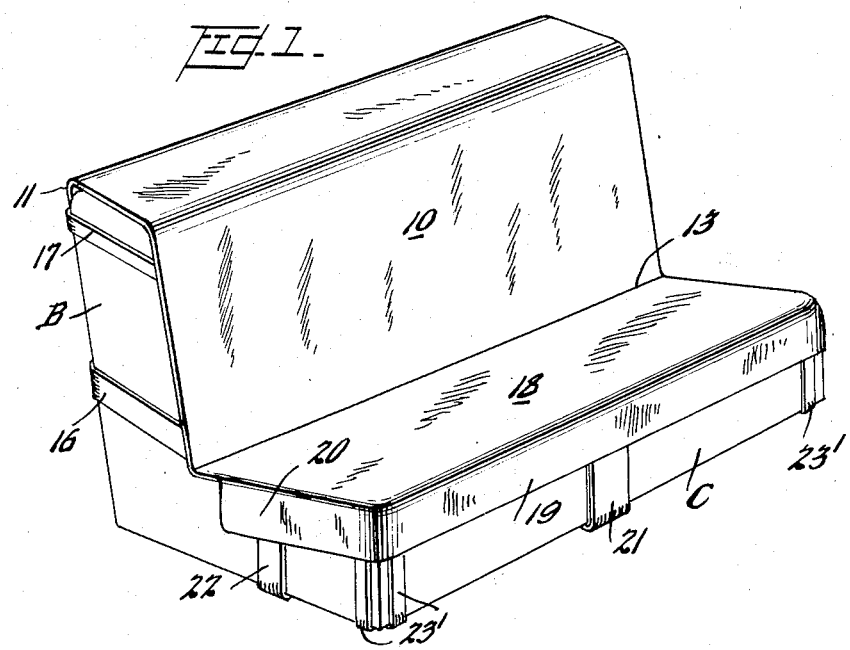
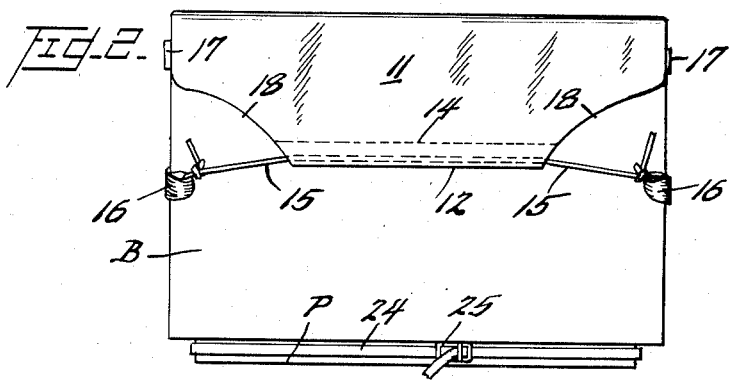
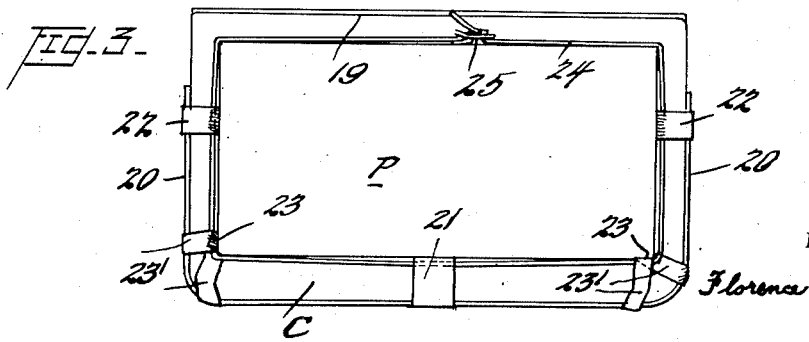
INVENTOR
Florence B. Zacks
BY Watson, Cole, Grindle & Watson
ATTORNEYS United States Patent Office 2,817,391
Patented Dec. 24, 1957

2,817,391
SEAT THROW
Florence B. Zacks, Columbus, Ohio
Application August 21, 1956, Serial No. 605,272
3 Claims. (Cl. 155—182)

This invention relates to seat throws particularly adapted for application to automobile seats.

It is a primary object of the invention to provide such a seat throw which may be of extremely simplified construction embodying a novel arrangement whereby the back rest cover portion thereof may be readily conformingly tensioned and maintained against bodily displacement on back rests of varying shapes and dimensions.

In particular, the invention contemplates the use of such a seat throw embodying a back rest cover which is folded over the upper edge of the back rest to have front and rear portions depending over the front and rear of the back rest respectively, the depending rear portion being connected to the front portion around the ends of the back rest in such a manner as to tension the front portion both vertically and horizontally over the back rest.

Preferably the back rest cover is connected at its lower portion to the seat cushion cover which is suitably secured to the seat cushion to anchor the back rest cover against bodily upward displacement.

It is a feature of the invention that by the novel construction here employed it is possible to avoid local attachment of any portion of the seat throw directly to the automobile seat and thus it is possible to avoid the imposition of localized strains or forces on the fabric of the seat throw.

The foregoing features and advantages are incorporated in the seat cover structure illustrated in the accompanying drawings in which:

Figure 1 represents a front perspective view of an automobile seat having the preferred embodiment of seat throw of the invention applied thereto.

Figure 2 is a rear elevation view on a reduced scale of the structure shown in Figure 1; and Figure 3 is a bottom plan view also on a reduced scale of the structure illustrated in Figure 1.

Referring now in detail to the accompanying drawings, the seat throw is there shown as applied to an automobile seat of conventional construction embodying a usual horizontal cushion C, which may be supported either directly on the automobile floor, or which may be spaced somewhat above the floor on a usual pedestal P. The seat also includes the usual generally vertically extending back rest B projecting upwardly from the rear of the cushion C.

The seat throw, which may be of any usual flexible fabric material, comprises a back rest cover folded over the upper edge of the back rest and having depending front and rear panels 10 and 11 respectively on the front and rear sides of the back rest. It will be noted that the rear panel 11 has its lower edge 12 upwardly displaced relative to the lower portion 13 of the front panel 10.

Along its lower edge 12 this rear panel is formed with a hem 14 extending generally horizontally for reception of a flexible tensioning element, such as the cord 15, the ends of which are connected to anchoring tabs or loops 16 of preferably non-stretchable fabric material, sewed or otherwise secured to the lower end portions of the front panel 10.

It will be noted that the anchoring loops or tabs 16 are connected to the front panel 10 at locations which are substantially below the connections of the element 15 to the rear panel 11. Thus the cord or element 15 together with the flexible tabs 16 will be seen to constitute a flexible tension means extending around the ends of the back rest B and interconnecting the front and rear panels at different levels in such a manner as to exert a downward pull on the rear panel 11.

Obviously the connection between the said tension means 15, 16 and the rear panel 11 may be other than the arrangement of the hem 14 and draw string 15 as in the preferred embodiment.

In order to tension both the front and back panels 10 and 11 in a lengthwise direction across the seat these panels are preferably interconnected at opposite ends of the seat back rest B by the elastic tension elements 17, the opposite ends of which are sewed or otherwise connected to the respective panels 10 and 11.

In the preferred embodiment of the invention, as shown in Figure 2, it will be seen that the hem 14 is of substantially lesser horizontal extent than the upper portion of the panel 11 and is connected thereto along the diagonal lines 18, whereby the endwise tension exerted on the back panel 11 by the resilient elements 17 may be transmitted to the lower edge portion 12 and hem 14 to prevent any undesirable drawing or gathering of this portion by the action of the tension element or draw string 15.

The seat cover portion 18 of the throw is arranged to lie flush on the upper horizontal surface of the seat cushion C and preferably provided with depending front and end skirt portions 19 and 20 respectively which may be stitched together with or otherwise interconnected at the corners in more or less usual manner. Secured to and depending from the skirt conjointly defined by these skirt portions 19 and 20 are a plurality of suitably arranged draw string loops 21, 22 and 23, which in the present instance are located at the respective ends, corners and mid-portion of the front of the seat cushion. A draw string or belt element 24 is slidably disposed through these several loops beneath the cushion C to draw their lower loop ends inwardly beneath the cushion C and by exerting tension on these respective loops to tension the cushion cover 18 over the upper surface of the cushion C.

The draw string or belt 24 may be drawn taut to any desired degree and secured in its desired position of adjustment by usual means such as a conventional belt buckle 25 illustrated in Figures 2 and 3.

Where the seat is supported on a pedestal P as in the present embodiment or by other means which may serve to limit the drawing taut of the belt 24, it will be desirable to form the several loops 21, 22 and 23 of a suitable elastic material whereby these may be stretched as the belt is drawn taut about the pedestal P and thereby at all times exert tension on the skirt portions 19 and 20 of the cushion cover 18.

It will be noted that the loops or members 22 extend beneath and substantially in vertical alignment with the generally vertical plan of the front panel 10 of the back rest cover to thus maintain the back rest cover panel against upward displacement.

It will be noted further that the loops 23 are arranged in such a manner that the upper ends of their respective legs 23' as shown in Figure 1, are connected to the depending skirt portions 19 and 20 respectively on opposite sides of the corners of the cushion C whereby a single such loop 23 may function to exert a downward pull on each of the two portions 19 and 20 of the depending skirt.

Although in this application I have shown and described only the preferred embodiment of the invention, it will be apparent that the invention is susceptible of modifications in various respects within the scope of the appended claims. The drawings and description herein accordingly are to be construed as merely illustrative in nature and not as restrictive.

Having thus described the invention, what is desired by Letters Patent is:

1. In combination with a seat including a generally horizontal cushion and a back rest extending generally vertically upwardly from the rear edge of said cushion, a seat throw comprising a flexible back rest cover folded over the upper edge of said back rest and having depending front and rear panels, said front panel extending substantially to the level of said cushion, and means for resisting upward displacement of said front panel, generally flexible tension means extending around the ends of said back rest and interconnecting corresponding ends of said front and rear panels, to exert endwise tension on said front panel, the connections of said means with the front panel being below its said connections with the rear panel to transmit a downward tension to the latter, said means for resisting upward displacement of said front panel comprises a seat cushion cover connected at its rear edge to the lower edge of said panel, said cushion cover having a skirt depending around the front and end edge of the cushion, draw string supporting loops depending from said skirt, and a draw string beneath said cushion operatively disposed through said loops, said draw string being in the form of an endless loop wholly disposed in a horizontal plane beneath said cushion.

2. The combination of claim 1 in which one of said loops comprises a length of flexible material having its opposite end connected to said skirt at locations relatively displaced around the corner of the seat cushion, the medial portion of said one loop extending generally diagonally beneath the seat cushion and slidably receiving said draw string, whereby said draw string may exert tension through said one loop both forwardly and endwise of the said cushion.

3. The combination of claim 2 in which said loops are of elastic material.

References Cited in the file of this patent

UNITED STATES PATENTS 2,619,156      Seaman _____ Nov. 25, 1952